June 3, 1952 L. D. JONES 2,599,331
INDUSTRIAL PROCESS AND APPARATUS
Filed March 3, 1950 3 Sheets-Sheet 2

INVENTOR.
LEO D. JONES
BY Hugo G. Kenman
ATTORNEY.

June 3, 1952          L. D. JONES          2,599,331
INDUSTRIAL PROCESS AND APPARATUS
Filed March 3, 1950          3 Sheets-Sheet 3

INVENTOR.
LEO D. JONES
BY Hugo G. Kenman
ATTORNEY.

Patented June 3, 1952

2,599,331

UNITED STATES PATENT OFFICE 2,599,331

INDUSTRIAL PROCESS AND APPARATUS

Leo D. Jones, Philadelphia, Pa., assignor to The Sharples Corporation, a corporation of Delaware Application March 3, 1950, Serial No. 147,396

9 Claims. (Cl. 260—418)

This invention relates to improved flow control methods and apparatus for continuously treating and reacting materials, such as a substance to be treated with a reagent and/or other materials, and is particularly adapted to the treatment of saponifiable materials with saponifying reagents in counter-current multistage treating and separating systems.

The invention is directed to improvements in the control of flow of materials and reagents in systems which involve a plurality of stages for reacting materials and reagents. In certain so-called counter-current processes of this type, the fresh reagent and material to be treated are fed into opposite ends of the system, and are caused to flow co-currently through the various stages employed, but counter-currently between such stages.

This invention will be more particularly described in connection with a multi-stage, counter-current process and apparatus for saponifying fat, employing a plurality of feed reservoirs, each reservoir being adapted to contain the mixture of saponifiable materials and saponifying reagent to be passed to a particular combined saponifying and separating stage. Between each feed reservoir and the separating unit of its respective stage is a feed valve adapted to control the flow of the mixture from the feed reservoir through said stage. The valve controlling the feed of mixture through the last stage is manually controlled to control the maximum output of the system, and each of the flow control valves in the intermediate stages is automatically controlled in accordance with the quantity of mixture in the feed reservoir connected to the output of the respective intermediate stage separating unit. The flow of mixture to the first stage is supplied from a feed reservoir, whose quantity of mixture automatically controls the rate of feed of saponifiable material and saponifying reagent to the system. Thus the adjustment of the manually operated valve which controls the output from the last stage of the system automatically controls the feed rate through the entire multi-stage system, in such a manner as to prevent overloading of, or overflowing in, any and all stages of the system.

Further features and advantages of the invention will become apparent to persons skilled in the art upon reference to the following specification and drawings in which.

While the invention is applicable to many general processes of the type involving mixture flow control through multiple stages, it will be particularly described in connection with a multi-stage process for saponification of fat in a plurality of successive counter-current treating stages, each stage involving a mixing of fat or partially saponified material with saponifying reagent which may be at least partially spent, and the subsequent separation of the products of reaction. It will be understood that the flow-controlling process and apparatus of this invention is not limited to such use in a soap-making process.

Figure 1:
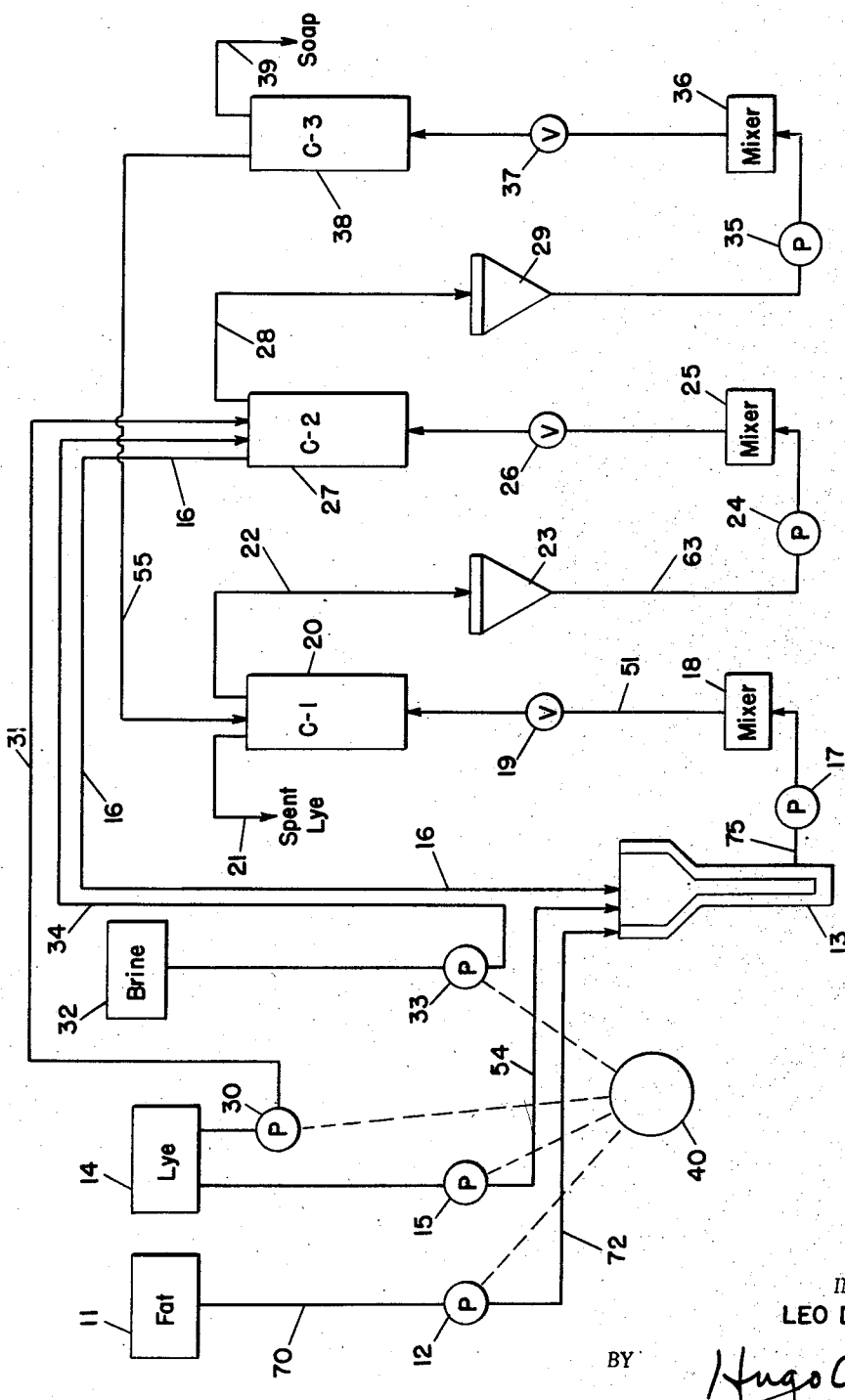
Figure 1 is a flow sheet of a process for fat saponification by use of the flow control method and apparatus of this invention.

In the process as illustrated in Figure 1, saponifiable material, such as animal fat and/or vegetable fat, is supplied from a source of supply 11 through a variable speed proportioning pump 12 to a first-stage feed reservoir 13. Saponifying reagent such as caustic soda or lye is fed from a source of supply 14 through a variable speed proportioning pump 15 into the first-stage feed reservoir 13 where it is used to strengthen the used saponifying reagent which is returned from a subsequent stage of the process through a conduit 16 as is employed in counter-current multi-stage saponification processes. In many cases the saponifying reagent from the subsequent stage of the process which is fed into the first-stage reservoir through the conduit 16 retains sufficient potency to permit the elimination of the feed of fresh saponifying reagent into the reservoir 13 through the pump 15. The mixture of fat and saponifying reagent is pumped from the first-stage reservoir 13 by a pump 17 to a saponifying mixer 18 in which the reagents and fat are thoroughly intermixed and reacted. Sometimes it is desirable to add the saponifying reagent directly to the mixture in the mixer 18 instead of with the fat in the reservoir 13 as illustrated.

Under the impelling pressure from the pump 17 the mixture passes from mixer 18 through an automatically controlled feed or flow control valve 19 into the first-stage centrifugal separator 20. Under centrifugal force the spent lye is separated from the partially saponified fat and is discharged from the heavy liquid outlet of the centrifugal separator 20, and is passed from the system through a conduit 21. The lighter partially saponified and separated material passes from the light liquid discharge port of the centrifugal separator 20 out through the discharge conduit 22 into a second stage feed reservoir 23. Caustic from a subsequent stage of the process is added to the partially saponified material in conduit 22 by passing the caustic from a conduit 55 into the light effluent discharge cover of the centrifugal separator 20 where the caustic is at least partially admixed with the discharging partially saponified fat to facilitate the washing of the saponified fat from the separator 20. On the other hand, the caustic in conduit 55 from the subsequent or last stage of the process may be added directly to the partially saponified fat in the second stage feed reservoir 23, or in the saponifying mixture 25 which follows. It should be noted, as will be later described in detail, that the feed control valve 19 is automatically controlled in accordance with the quantity of mixture in feed reservoir 23 to maintain a desired quantity of mixture in such reservoir 23. As will be noted, the rate from or delivery by the proportioning pumps 12, 15, 30 and 33 is automatically controlled in accordance with the quantity of mixture in feed reservoir 13 to maintain a desired quantity of mixture in such reservoir.

The mixture in the second-stage feed reservoir 23 is fed by a pump 24 into a second-stage saponifying mixture 25 which may be of the same type as the first-stage saponifying mixer 18. Under the impelling pressure from the pump 24 the mixture from the second-stage mixer 25 passes through a feed flow control valve 26 into the second-stage centrifugal separator 27. The partially used caustic which is discharged from this centrifugal separator 27 through its heavy effluent discharge port passes into the conduit 16 through which it is delivered to be admixed with fresh fat in the fed reservoir 13 of the first stage of the process. Material which has been additionally saponified in the second-stage reaction is discharged from the centrifugal separator 27 through the light effluent discharge ports and into a conduit 28 which is connected to a third-stage feed reservoir 29. Fresh caustic from the source of supply 14 is pumped by the proportioning pump 30 through a conduit 31 to be added either in the light effluent discharge cover of the centrifugal separator 27, as illustrated, or directly to the third-stage feed reservoir 29, or to the saponifying mixture 36 which follows, as desired. Note that the feed control valve 26 is controlled in accordance with the amount of mixture in feed reservoir 29, similar to the control of valve 19 by reservoir 23, and the control of proportioning pumps 12, 15, 30 and 33 by reservoir 13.

A brine solution for graining the soap which is formed in the process may also be added at this time. For example, such a solution might be supplied from a brine source 32 by a proportioning pump 33 through a conduit 34 into either the light effluent discharge cover of the centrifugal separator 27, as illustrated; or directly to the third-stage reservoir 29; or to the saponifying mixer 36 which follows. On the other hand, it may be desirable to dispense with the use of brine as a graining agent, and to grain the soap by employing an excess of caustic. It will be understood that neither the method of graining, nor any other feature of soap-making is a limitation of the invention, and that the foregoing is merely illustrative.

The material from the third-stage reservoir 29 is pumped by a pump 35 into a third-stage saponifying mixer 36 which may be of the same type as the mixers 18 and 25 previously described. Under pressure from the pump 35 the mixture passes from the mixer 36, through a feed flow control valve 37 into the third-stage centrifugal separator 38. The heavy caustic separated in the centrifugal separator 38 is discharged through the heavy effluent discharge ports, and passes out into the conduit 55 through which it may be returned to an earlier stage of the process, such as to be effectively added to the mixture in the feed reservoir 23. Soap is discharged from the light effluent discharge ports of the centrifugal separator 38 into a conduit 39.

As shown, the pumps 12, 15, 30 and 33 which proportion the fat materials and reagents into the process may be interconnected and driven from a common flow controller source such as a variable speed motor device and rotary valve mechanism 40 responsive to the quantity of mixture in feed reservoir 13, the particular construction and arrangement of which will be well understood by persons skilled in this art. Alternatively, it may be desirable to drive the intercontrolled proportioning pumps directly from a single source of power, and to control the overall rate of feed of materials into the system by controlling this source of power in accordance with the quantity of mixture in the first stage feed reservoir 13.

To control the flow of materials to be treated, and reagents through the entire process according to the method of this invention, the feed flow control valve 37 is operated to control the output from the last stage centrifugal separator 38. This adjustment may be made in accordance with the known average capacities of the various components of the system, and with the characteristics of the soap discharged through the conduit 39, or otherwise, as desired. When this adjustment is made, the rates of flow of materials to the system are regulated correspondingly through the features of the invention including the automatically controlling feed reservoirs 13, 23 and 29, and associated flow controlling valve mechanisms.

The adjustment of the valve 37 controls the amount of material which may be drawn from the reservoir 29, and impelled by the pump 35 through the mixer 36, as should be readily understood. The apparatus which will be later described in connection with Figure 2 of the drawings acts to control the rate of flow through automatically controlled valve 26 into the second-stage centrifugal separator 27. This latter control establishes the amount of material which may be drawn from the reservoir 23, and impelled by the pump 24 through the saponifying mixer 25. In turn apparatus similar to that illustrated in Figure 2 acts to control the rate of flow through the automatically controlled feed valve 19 into the first-stage centrifugal separator 20.

Figure 2:
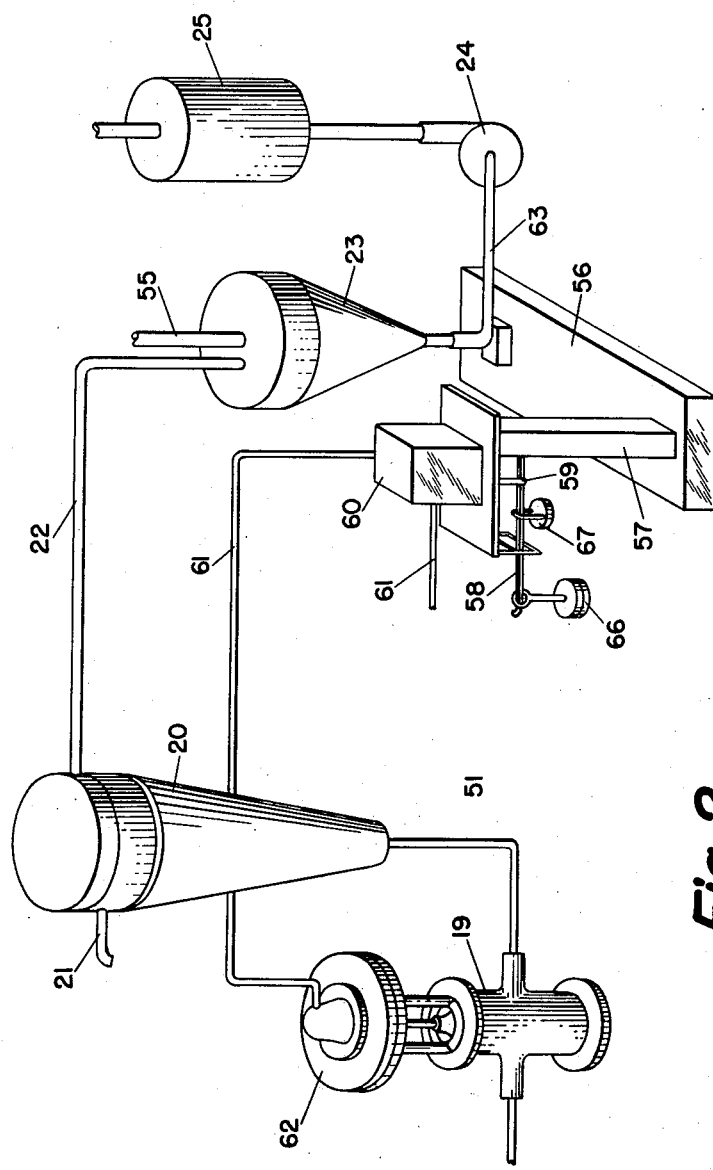
Figure 2 is a perspective view of an embodiment of the feed reservoir apparatus, and automatic feed control valves for the intermediate stages of the process of Figure 1.

As illustrated in Figure 2, the apparatus which may be applied to the intermediate stages of the process, and excepting the final stage, may comprise, for example, the fluid pressure actuated feed valve 19 in the conduit 51 leading to the first stage centrifugal separator 20. The valve 19 may be constructed similarly to the pressure actuated valve shown in thet U. S. Patent 2,271,-493 to Brewer. The discharged effluent, comprising partially reacted fat and any added reagent from the centrifugal separator 20, flows through the conduit 22 into the feed reservoir 23 which may be cone-shaped, as illustrated. It may be desired to add reagent, such as caustic, into the reservoir 23 through a conduit 55. The reservoir 23 is adapted to be supported on a platform 56 of a scale or balance 57. An increase or decrease in the quantity of material in the reservoir 23 will produce a related response in a balance arm 58 of the balance 57 to cause a corresponding response of an actuating lever 59. The actuating lever 59 is connected to control the operation of a valve 60 in a conduit 61 containing a fluid pressure which is connected to a fluid motor 62 for actuating the fluid actuated feed control valve 19. It will be understood, as previously mentioned, that increases or decreases in the quantity of the mixture in the reservoir 23 cause an inverse change in the rate of flow through the feed flow control valve 19. In other words, an increase in quantity of mixture in the reservoir 23 immediately causes a reduction in flow in line 51 into the centrifugal separator 20 by effecting a partial closing of the valve 19 and conversely, a decrease in the quantity of mixture in the reservoir 23 immediately causes an increase in the flow through the valve 19. The mixture is constantly being withdrawn from the reservoir 23 through a flexible conduit 63 by the pressure pump 24, and impelled to and through the saponifying mixer 25. An initial control of the quantity of mixture in the feed reservoir 23 may be established by adjusting the weights 66 and 67 on the balance arm 58.

From the foregoing description it is evident that the feed flow control valve 19, the centrifugal separator 20, and the other portions of the apparatus shown in Figure 2, may be counterparts of valve 26, centrifugal separator 27, and the other related portions shown in the flow sheet in Figure 1. The apparatus of Figure 2 is, therefore, applicable at two parts of the flow sheet of Figure 1 as previously explained.

Figure 3:
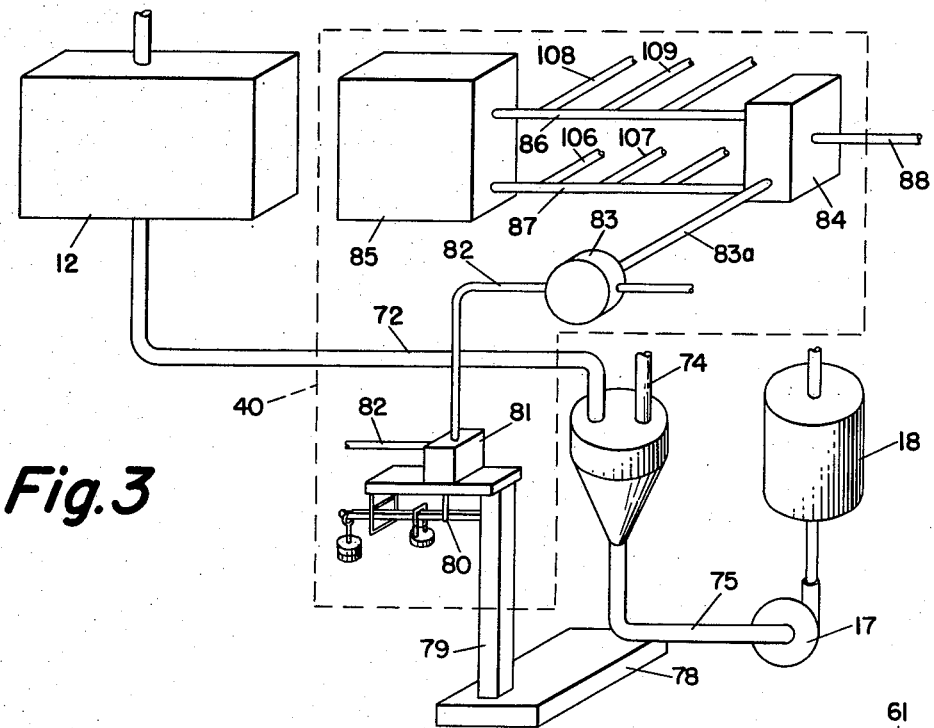
Figure 3 is a view, in perspective, of one type of feed reservoir, and means for automatically controlling variable rate proportioning devices for use in connection with the initial feeding of reactants to the system.

Figure 3 illustrates a means of controlling the proportioned flow of fats and reagents into the process. Fats to be treated are drawn from a source, such as the source 11 shown in Figure 1, through a conduit 70, and fed, for example, into a double acting piston type proportioning pump 12, having, for example, the construction illustrated in my prior Patent 2,009,890. The fat is then pumped through a conduit 72 into the first stage feed reservoir 13. As shown, treating material or reagent from a subsequent stage of the process, fresh reagent, or a mixture of reagents may be passed into this reservoir 13 through a conduit 74 which may be connected with conduits 16 and 54 shown in Figure 1. The resultant mixture is withdrawn from the reservoir 13 through flexible conduit 75, by pump 17, and is impelled into the process, passing through the saponifying mixer 18.

The feed reservoir 13 may be supported on a platform 78 of a scale or balance 79. In the manner previously described, an actuating lever 80 moves in response to the amount of material in the reservoir 13. This actuating lever 80 controls a fluid valve 81 in a fluid pressure containing conduit 82 leading to a variable speed device which may take the form of a fluid motor or turbine diagrammatically illustrated at 83 which together with a rotary valve diagrammatically illustrated at 84 corresponds to the control device 40 shown in Figure 1.

The speed of the fluid motor 83 is thus dependent upon the position (degree of opening) of the pressure control valve 81. This position of the valve 81 is determined by the amount of mixture in the reservoir 13. If the amount of mixture in the reservoir 13 increases, the speed of the fluid motor 83 is reduced. On the other hand, the speed of the fluid motor 83 is increased if the amount of mixture in the reservoir 13 diminishes.

The operation of a flow controller or rotary valve 84 is dependent upon the fluid motor 83. The speed of rotation of valve 84 in turn controls the speed of operation of a fluid motor diagrammatically illustrated at 85 which drives the fat proportioning pump 12 (or any of the other proportioning pumps 15, 30 and 33). As shown in Figure 3, the fluid conduits 86 and 87 lead from the rotary valve 84 to control fluid motor 85, fluid conduit 88 leading to rotary valve 84.

Conduits 106, 107, 108 and 109 are illustrative of the additional fluid connections which can be made from the rotary flow control valve 84 to other fluid motors similar to the motor 85 referred to above for driving the proportioning pumps for other materials and reagents such as the pumps 15, 30 and 33. Through proper adjustment of the stroke of each proportioning pump the proportions of the various materials being supplied to the process may be predetermined. Because of the single rotary control valve 84, all proportioning pumps 12, 15, 30 and 33 will operate at the same speed.

It will be seen that the speed of rotation of the fluid motor 83 is controlled by fluid pressure valve 81 which in turn is controlled by the quantity of mixture in the reservoir 13. Since the rotary valve 84 is driven by the motor 83, the rate at which fluid impulses are sent through conduits 86 and 87 to actuate fluid motor 85 depends upon the relative position of valve 81. Fluid motor 85 controls the speed of operation of the proportioning pump 12 thus making the amount of material fed by the pump dependent upon the degree of opening of fluid pressure valve 81. As noted previously, fluid pressure valve 81 is automatically controlled by the quantity of mixture in the reservoir 13 to increase the fluid pressure in conduit 82 to the fluid motor 83 as the quantity of material in the reservoir 13 decreases, and vice versa. As stated before, proportioning pump 12 is analogous to any of the other proportioning pumps 15, 30 and 33, and the additional pumps will be controlled by the rotary valve 84 through the additional conduits 106, 107, 108 and 109, etc., as required.

It will be apparent to those skilled in the art after study of the foregoing disclosure that other types of fluid motors such as turbines and gear motors may be used in place of vane type motor 83. It should also be evident that equivalent electrical units could be substituted for the control valve 81 and the fluid motor 83. In any case the rate of proportioned pumping by the proportioning pumps 12, 15, 30 and 33 would be made inversely related to the amount of material in the reservoir 13.

Figure 4:
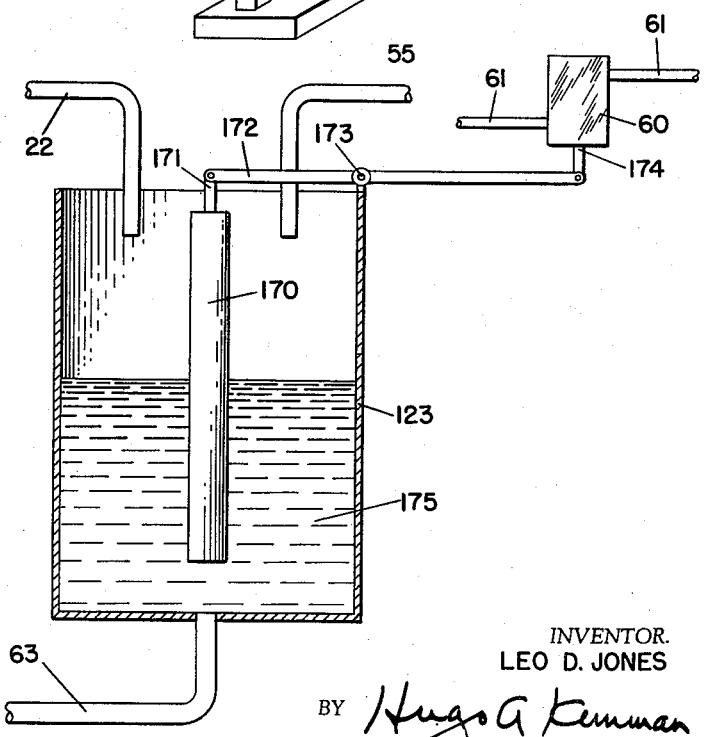
Figure 4 is a diagrammatic illustration of another form of inter-stage feed reservoir with means to automatically control the feed rate through the preceding stage.

An alternative means of automatically actuating the feed controlling valves 19 and 26 is shown in Figure 4 of the drawings. In such embodiment, the feed reservoir 123 is adapted to take the place of reservoir 23. A liquid displacement or float member 170 vertically extending within the reservoir 123 is connected by a link 171 to the short end of a lever arm 172 pivoted at 173. The other end of the lever arm 172 is connected by a link 174 to actuate the fluid pressure valve 60 as previously described in connection with Figure 2 of the drawings. As the quantity of mixture 175 in the feed reservoir 123 increases, a greater amount of mixture will be displaced by the member 170 causing it to rise to in turn cause a response of the valve 60 in a manner to decrease the mixture flow through the feed control valve 19, thus maintaining a predetermined level of mixture in the reservoir 123. It will be noted that the displacement member 170 is of a length approximately the depth of the reservoir 123 so that it will be responsive in the presence of a foamy mixture in the reservoir 123.

It will be obvious that a reservoir 123 and associated mechanism may be substituted for reservoir 29 and its associated mechanism.

It should now be apparent that other types of mechanisms responsive to the quantity of mixture in the feed reservoirs may be used to actuate the feed flow control valves and the proportioning pumps in such counter-current multi-stage processes according to the manner of this invention. For example, the mixture quantity responsive device shown in Figure 4 may be used to actuate the pressure control valve 81 shown in Figure 3 of the drawings in a manner to control the rate of proportioned feeding of fats and reagents to the process in accordance with the quantity of mixture in the feed reservoir 13 which itself is ultimately governed by the adjustment of the manual control valve 37.

Obviously, the invention is not limited to a three-stage process such as has been specifically described, nor to the saponification of soap, but may be applied to any multi-stage process involving the flow of mixtures of any nature through one or a plurality of reaction stages which may individually vary in output rates due to varying conditions of the respective stage apparatus.

Having particularly described my invention, it is understood that this is by way of illustration, and that it is intended that the patent shall cover, by suitable expression in the claims, whatever features of patentable novelty reside in the invention.

I claim:

1. In a multi-stage continuous system for the treatment with a treating phase of a phase to be treated, each said stage comprising a feed receptacle, a pump, a mixer, flow control means, and a phase separator, said system having means for feeding phase to be treated to the feed receptacle of the first stage thereof and means for feeding treating phase to the last stage thereof, and means for advancing said phases from stage to stage in opposite directions, said phase to be treated advancing successively through the feed receptacles of said stages, the improvement which comprises means for varying the rate of flow of said phases to said system, means responsive to the quantity of material in the first stage feed receptacle for controlling said last-mentioned means to decrease and increase the feed of said phases to said system with increase and decrease respectively in the quantity of material in said first stage feed receptacle, and means for each stage subsequent to said first stage and responsive to the quantity of material in the feed receptacle of said subsequent stage for controlling the flow control means of the next preceding stage to decrease and increase the flow through said preceding stage with increase and decrease respectively in the quantity of material in the feed receptacle of said subsequent stage.

2. The apparatus of claim 1 characterized by means for advancing the treating phase from stage to stage successively through the feed receptacles of the stages.

3. The combination with a multi-stage continuous system for the treatment of saponifiable fat with a saponifying agent, each said stage comprising a feed receptacle, a pump, a mixer, flow control means, and a phase separator, said system having means for feeding said fat to the feed receptacle of the first stage thereof, means for feeding said saponifying agent to the last stage thereof, and means for advancing said fat and said saponifying agent from stage to stage in opposite directions, said fat advancing successively through the feed receptacles of said stages; of means for varying the rate of flow of said fat and of said saponifying agent to said system, means responsive to the quantity of material in the first stage feed receptacle for controlling said last-mentioned means to decrease and increase the feed of said fat and of said saponifying agent to said system with increase and decrease respectively in the quantity of material in said first stage feed receptacle, and means for each stage subsequent to said first stage and responsive to the quantity of material in the feed receptacle of said subsequent stage for controlling the flow control means of the next preceding stage to decrease and increase the flow through said preceding stage with increase and decrease respectively in the quantity of material in the feed receptacle of said subsequent stage.

4. The combination with a multi-stage continuous system for the treatment of saponifiable fat with a saponifying agent, each said stage comprising a feed receptacle, a pump, a mixer, flow control means, and a phase separator, said system having means for feeding said fat to the feed receptacle of the first stage thereof, means for feeding said saponifying agent to the feed receptacle of the last stage thereof, and means for advancing said fat and said saponifying agent from stage to stage in opposite directions through the feed receptacles of the respective stages; of means for varying the rate of flow of said fat and of said saponifying agent to said system, means responsive to the quantity of material in the first stage feed receptacle for controlling said last-mentioned means to decrease and increase the feed of said fat and of said saponifying agent to said system with increase and decrease respectively in the quantity of material in said first stage feed receptacle, means for each stage subsequent to said first stage and responsive to the quantity of material in the feed receptacle of said subsequent stage for controlling the flow control means of the next preceding stage to decrease and increase the flow of said fat and said saponifying agent through said preceding stage with increase and decrease respectively in the quantity of material in the feed receptacle of said subsequent stage, and means for independently controlling the flow control means in the last stage of said system.

5. The combination with a multi-stage continuous system for the treatment of a saponifiable fat with a saponifying agent and a graining agent in the manufacture of soap, each said stage comprising a feed receptacle, a pump, a mixer, flow control means, and a phase separator, said system having means for feeding said fat to the feed receptacle of the first stage thereof, means for feeding saponifying agent and graining agent to the feed receptacle of the last stage thereof, means for advancing said fat successively through the feed receptacles of said stages from the first stage to the last stage, and means for advancing said saponifying agent and said graining agent successively through the feed receptacles of said stages from the last stage to the first stage; of means for varying the rate of flow of said fat, said saponifying agent and said graining agent to said system, means responsive to the quantity of material in the first stage feed receptacle for controlling said last-mentioned means to decrease and increase the feed of said fat, said saponifying agent and said graining agent to said system with increase and decrease respectively in the quantity of material in said first stage feed receptacle, and means for each stage subsequent to said first stage and responsive to the quantity of material in the feed receptacle of said subsequent stage for controlling the flow control means of the next preceding stage to decrease and increase the combined flow of fat, saponifying agent and graining agent through said preceding stage with increase and decrease respectively in the quantity of material in the feed receptacle of said subsequent stage.

6. In a process for the treatment in a multistage system of a phase containing saponifiable fat with a phase containing a saponifying and graining agent for the production of soap, wherein in each stage said phases are intimately mixed and then separated, and wherein the respective phases are fed to opposite ends of said system and progress from stage to stage through said system in opposite directions, said phase containing saponifiable fat being fed to the first stage, and said phase containing saponifying and graining agent being fed to the last stage, of steps for regulating the flow of said phases through said system, said steps comprising directing the flow to the first stage of said phase containing saponifiable fat into an accumulated body of said phase, pumping a stream of said last-mentioned phase from said accumulated body for advancement through said first stage, controlling the rate of flow of both said phases to said system through the quantity of material in said body to decrease and increase such flow with increase and decrease respectively in the quantity of material in said body, and for each stage subsequent to said first stage directing the flow of said phase containing saponifiable fat as fed thereto into an accumulated body of said phase, pumping a stream of said last-mentioned phase from said last-mentioned accumulated body for advancement through its respective stage, and in each said subsequent stage controlling the rate of flow through the next preceding stage through the quantity of material in the accumulated body of the respective subsequent stage to decrease and increase the flow through said preceding stage with increase and decrease respectively in the quantity of material in said last-mentioned accumulated body.

7. A process in accordance with claim 6 in which both phases flowing to each stage are directed into the accumulated body for said stage.

8. A process in accordance with claim 6 in which the rate of flow from the accumulated body of the last stage is controlled to in turn control the rate of flow of both phases through the system.

9. A process in accordance with claim 7 in which the rate of flow from the accumulated body of the last stage is controlled to in turn control the rate of flow of both phases through the system.

LEO D. JONES.

REFERENCES CITED

The following references are of record in the file of this patent:

UNITED STATES PATENTS

| Number | Name | Date |
|---|---|---|
| 2,159,397 | Mills | May 23, 1939 |
| 2,335,457 | Sender | Nov. 30, 1943 |
| 2,499,388 | Jones | Mar. 7, 1950 |
| 2,499,389 | Jones et al. | Mar. 7, 1950 |